United States Patent [19]

Karino

[11] Patent Number: 5,677,935

[45] Date of Patent: Oct. 14, 1997

[54] SYNC DETECTING METHOD AND SYNC DETECTING CIRCUIT

[75] Inventor: Shingo Karino, Kanagawa, Japan

[73] Assignee: Matsuhita Electric Industrial Co., Ltd., Osaka, Japan

[21] Appl. No.: 584,371

[22] Filed: Jan. 11, 1996

[30]    Foreign Application Priority Data

Jan. 11, 1995 [JP]    Japan ................................ 7-002349

[51] Int. Cl.$^6$ ........................................................ H04L 7/00
[52] U.S. Cl. ........................................ 375/368; 375/373
[58] Field of Search ................................ 375/368, 367, 375/373; 327/141, 147; 370/100.1, 105.4, 106

[56]    References Cited

U.S. PATENT DOCUMENTS 4,196,416  4/1980  Stein ........................................ 375/368
4,620,300  10/1986  Ogawa ...................................... 375/368

FOREIGN PATENT DOCUMENTS 61-101139  5/1986  Japan.

*Primary Examiner*—Stephen Chin
*Assistant Examiner*—Joseph Roundtree
*Attorney, Agent, or Firm*—McDermot, Will & Emery

[57]    ABSTRACT

A sync pattern detecting circuit detects a sync pattern from the input data to output a sync pattern detecting signal. A frame counter counts clock signals for the bit number of one frame to output a frame count signal. A sync manage circuit sets a window time area therein, and outputs a sync signal when the sync pattern detecting signal is input in the window time area. The width of the window time area is variable. The width of the window time area is controlled at timings at which the sync pattern detecting signal and the frame count signal are input.

6 Claims, 14 Drawing Sheets

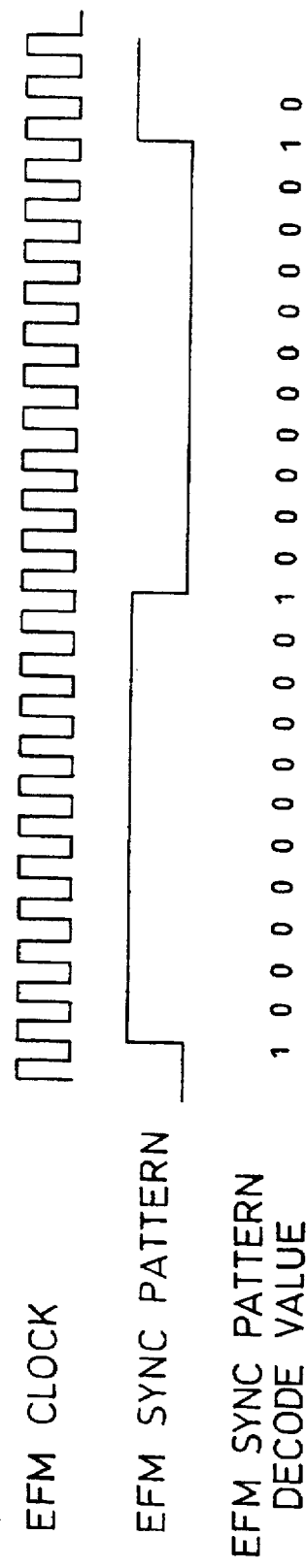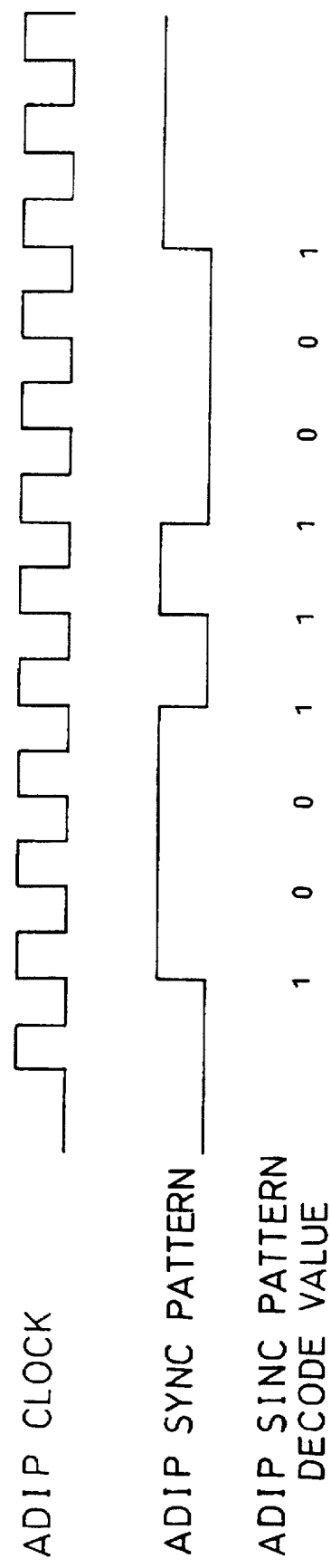

SYNC DETECTING METHOD AND SYNC DETECTING CIRCUIT

BACKGROUND OF THE INVENTION

The present invention relates to a sync detecting method and a sync detecting circuit for detecting a sync pattern for synchronization from the digital data which is frame-synchronized and modulated, and more particularly to a sync detecting method and a sync detecting circuit for controlling the conditions of the subsequent sync pattern detection on the basis of the information about the past sync pattern detection so as to prevent the malfunction of sync detection from occurring due to a pseudo-sync pattern and the like.

A so-called frame-synchronizing and modulating method has conventionally been utilized, wherein digital data is divided every constant bits to make respective frames, a sync pattern which represents frame brake is added to the header portion of each frame data at the time of modulation, and a data receiving portion detects the sync pattern to execute synchronization, so that data transmission is performed.

A mini disk (MD) unit will be described as an example in which the frame-synchronizing and modulating method is used. FIG. 12 is a block diagram showing the schematic structure of the mini disk unit.

When reproducing a sound, an EFM signal is read from a disk, converted into digital data by EFM demodulation and temporarily stored in a memory. An error is corrected by an ECC circuit, and then the digital data is decompressed and converted into digital data for music. The digital data for music is D/A converted and output through a speaker, or transmitted as a PCM signal to another device.

When recording a sound, a PCM signal input from the outside or a sound signal input through a microphone and the like is A/D converted into digital data for music, and the digital data for music is compressed, a code for error correction or the like is added to the digital data for music by the ECC circuit, and the digital data for music is EFM-modulated and then written to the disk.

An ADIP signal indicative of a disk address is converted into digital data by an ADIP circuit, and then transmitted as an address signal to an external control circuit and others.

All the EFM signal, ADIP signal and digital data in the mini disk unit include sync patterns. Each portion of the mini disk unit detects the sync pattern and is synchronized.

FIG. 13 is a block diagram showing the schematic structure of an EFM demodulating circuit. An EFM signal input to the EFM demodulating circuit is output to a sync detecting circuit 60 and a 14-8 converting circuit 62. The sync detecting circuit 60 detects the sync pattern for the EFM signal to output a sync signal. The 14-8 converting circuit 62 is synchronized by the sync signal output from the sync detecting circuit 60, and demodulates the EFM signal to EFM demodulation data.

FIGS. 14A and 14B show examples of an actual sync pattern. FIG. 14A shows a sync pattern for the EFM signal. FIG. 14B shows a sync pattern for the ADIP signal. A sync pattern decode value "1" means that a signal is inverted. A sync pattern decode value "0" means that the signal is not inverted. A signal pattern which never appears in the data portion of each signal is selected as a sync pattern.

According to the mini disk unit shown in FIG. 12, it is very important that a sync pattern is accurately detected. More specifically, a sync detecting method and a sync detecting circuit which seldom malfunction and have good properties should be employed so that a device can normally operate.

However, the sync detecting method and sync detecting circuit according to the prior art have the following drawbacks.

A sync pattern is determined so as not to match the results of modulation of the data portion of each signal. Accordingly, if the reliability of the transmission line of a digital signal is extremely high, the signal is accurately demodulated. However, there is a probability that transmission errors will be caused in the actual transmission line. Consequently, the signal is not demodulated accurately in the following cases.

In the case where a sync pattern itself is changed by transmission errors, it cannot be detected on the data receiving side. For this reason, the frame break cannot be recognized. Consequently, a signal cannot be demodulated.

Further, in the case where the data portion of a signal is changed by transmission errors so that the same signal pattern as a sync pattern, i.e., a pseudo-sync pattern is generated, the pseudo-sync pattern is recognized as a normal sync pattern on the data receiving side. Consequently, the frame break is recognized in error.

In order to prevent such malfunctions, Japanese Laid-Open Patent No. 61-101139 has disclosed a method in which a window time area is set in the vicinity of a precise sync position and a sync pattern is not detected in areas other than the window time area, or a method in which a dummy sync pattern detecting signal is interpolated if a sync pattern is not detected in an anticipated sync position.

However, the structure described in Japanese Laid-Open Patent No. 61-101139 has the following problems.

The width of the window time area is fixed. If the sync pattern is not detected, the width of the window time area is set infinitely so as to look for the sync pattern. In this case, the probability that a malfunction will occur due to pseudo-sync pattern detection is remarkably increased.

Further, the results of decision of data errors are utilized in order to enhance the precision in sync pattern detection. Error decision should originally be performed on the premise that a correct sync pattern is detected. Therefore, even if the sync pattern is detected on the basis of error decision in which the premise is not always ensured, the structure itself is inconsistent. Consequently, good effects cannot be obtained.

Moreover, the measures to the operation such as music jump reproduction which is not ordinarily executed in the mini disk unit are not considered.

SUMMARY OF THE INVENTION

It is an object of the present invention to provide a sync detecting method and a sync detecting circuit having much better detecting precision than in the prior art, wherein the sync detecting malfunction can be prevented from occurring due to a pseudo-sync pattern or the like when detecting a sync pattern from the digital data which is frame-synchronized and modulated.

In order to achieve the object described above, a variable window time area is set to control the width thereof according to the past sync pattern detecting precision. The width of the window time area can be set infinitely by an interrupt signal input from the outside.

The present invention provides a sync detecting method for detecting a sync pattern signal from a digital signal in which the sync pattern signal is inserted every constant bits by frame-synchronization and modulation, and for outputting a sync signal comprising a sync pattern detecting step of detecting the same signal pattern as that of the sync pattern signal from the digital signal to output a sync pattern detecting signal, and a sync manage step of setting a variable window time area having the same time cycle as that of the insertion of the sync pattern signal, and outputting the sync signal which indicates that a correct sync pattern signal is detected when the sync pattern detecting signal is output in the window time area.

According to such a structure, if the digital signal which is frame-synchronized and modulated has the same signal pattern as that of the sync pattern signal, the sync pattern detecting signal is output at the sync pattern detecting step. At the sync manage step, the window time area having the same time cycle as that of the correct sync pattern signal is set. When the sync pattern detecting signal is output in the window time area, the sync signal is output. Consequently, the sync pattern matching is carried out only in the vicinity of a timing at which the correct sync pattern signal is inserted. The sync pattern detecting signal which detects the pseudo-sync pattern is removed. When the correct sync pattern signal is detected, the sync signal is output. The width of the window time area which is variable can optionally be set depending on the reliability of the transmission line of the digital signal and the like. In addition, the width of the window time area can suitably be controlled according to the conditions of the detection of the sync pattern signal.

The following structure can be added, which further comprises a frame count step of counting clock signals which are synchronized with the digital signal, and outputting a frame count signal when a count number reaches the bit number of a frame having the constant number of bits and the sync pattern signal, wherein the sync manage step includes a first processing for setting the width of the window time area on the basis of a timing at which the sync pattern detecting signal is output and a timing at which the frame count signal is output, a second processing for outputting the sync signal when the sync pattern detecting signal is output in the window time area, and a third processing for outputting a reset signal when the sync pattern detecting signal or the frame count signal is output in the window time area, and wherein the frame count step includes a processing for resetting the count number of the clock signals when the reset signal is output.

According to such a structure, the width of the window time area is set on the basis of the timing of the sync pattern detecting signal and that of the frame count signal output at the frame count step. When the sync pattern detecting signal or the frame count signal is output in the window time area, the reset signal is output. The count obtained at the frame count step is reset by the reset signal. Consequently, the timing of the frame count signal is corrected. Thus, even if the timing of the sync pattern signal is shifted, the width of the window time area can suitably be controlled.

The sync manage step may further include a fourth processing for outputting the sync signal when the frame count signal is output in the window time area.

According to such a structure, the sync signal is output when the frame count signal is output in the window time area also in a frame in which the sync pattern signal cannot be detected. Consequently, the sync signal is not absent in each frame of the digital signal, so that the reliability of the operation of a circuit which utilizes the sync signal can be enhanced.

The sync manage step may further include a fifth processing for setting the width of the window time area infinitely by an interrupt signal input from the outside.

According to such a structure, the width of the window time area is set infinitely by the interrupt signal input from the outside, so that it can immediately correspond to the operation such as music Jump reproduction which is not ordinarily executed in a mini disk unit.

There may further be comprised another sync manage step including the same processing as each of the first, second and fourth processings and a processing for closing the window time area when the frame count signal is output.

According to such a structure, two sync signals or more cannot be output for one frame. Consequently, the reliability of the operation of the circuit which utilizes the sync signal can be enhanced.

These and other objects, features, aspects and advantages of the present invention will become more apparent from the following detailed description of the present invention when taken in conjunction with the accompanying drawings.

BRIEF DESCRIPTION OF THE DRAWINGS

The present invention will be detailed in conjunction with accompanying drawings in which:

FIGS. 14A and 14B are diagrams showing examples of a sync pattern.

DETAILED DESCRIPTION OF PREFERRED EMBODIMENTS

A sync detecting method and a sync detecting circuit according to embodiments of the present invention will be described with reference to the drawings.

(Embodiment 1)

Figure 1:
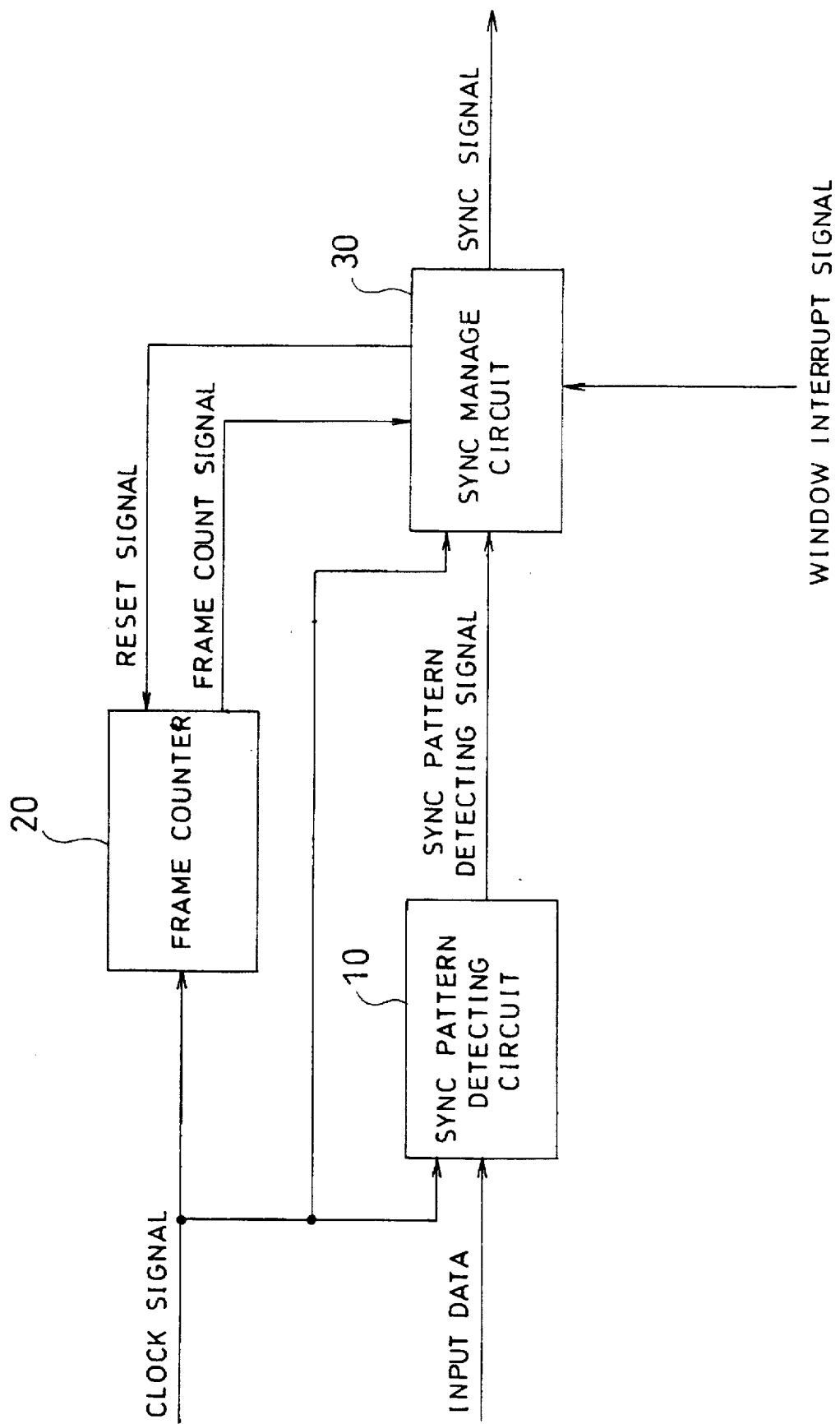
FIG. 1 is a diagram showing the structure of a sync detecting circuit according to Embodiments 1 to 3 of the present invention.

FIG. 1 is a diagram showing the structure of a sync detecting circuit according to Embodiment 1 of the present invention. In FIG. 1, a sync pattern detecting circuit is indicated at 10, a frame counter is indicated at 20, and a sync manage circuit is indicated at 30.

The sync pattern detecting circuit 10 matches a sync pattern for the input digital data. When the same bit pattern as the sync pattern is detected, a sync pattern detecting signal is output.

When the frame counter 20 counts the input clock signals for the bit number of a frame of the input digital data, it outputs a frame count signal. If a reset signal is input from the sync manage circuit 30, the count of the clock signals is reset.

The sync manage circuit 80 sets therein a variable window time area having the same cycle as that of a sync signal according to the sync pattern detecting signal and the frame count signal which are input. When the sync pattern detecting signal is input in the window time area, a sync signal is output. When the sync pattern detecting signal is input to the outside of the window time area, the sync signal is not output. When the sync pattern detecting signal and the frame count signal are input in the window time area, a reset signal is output to the frame counter 20.

A sync detecting method executed in the sync detecting circuit shown in FIG. 1 will be described below.

Figure 2:
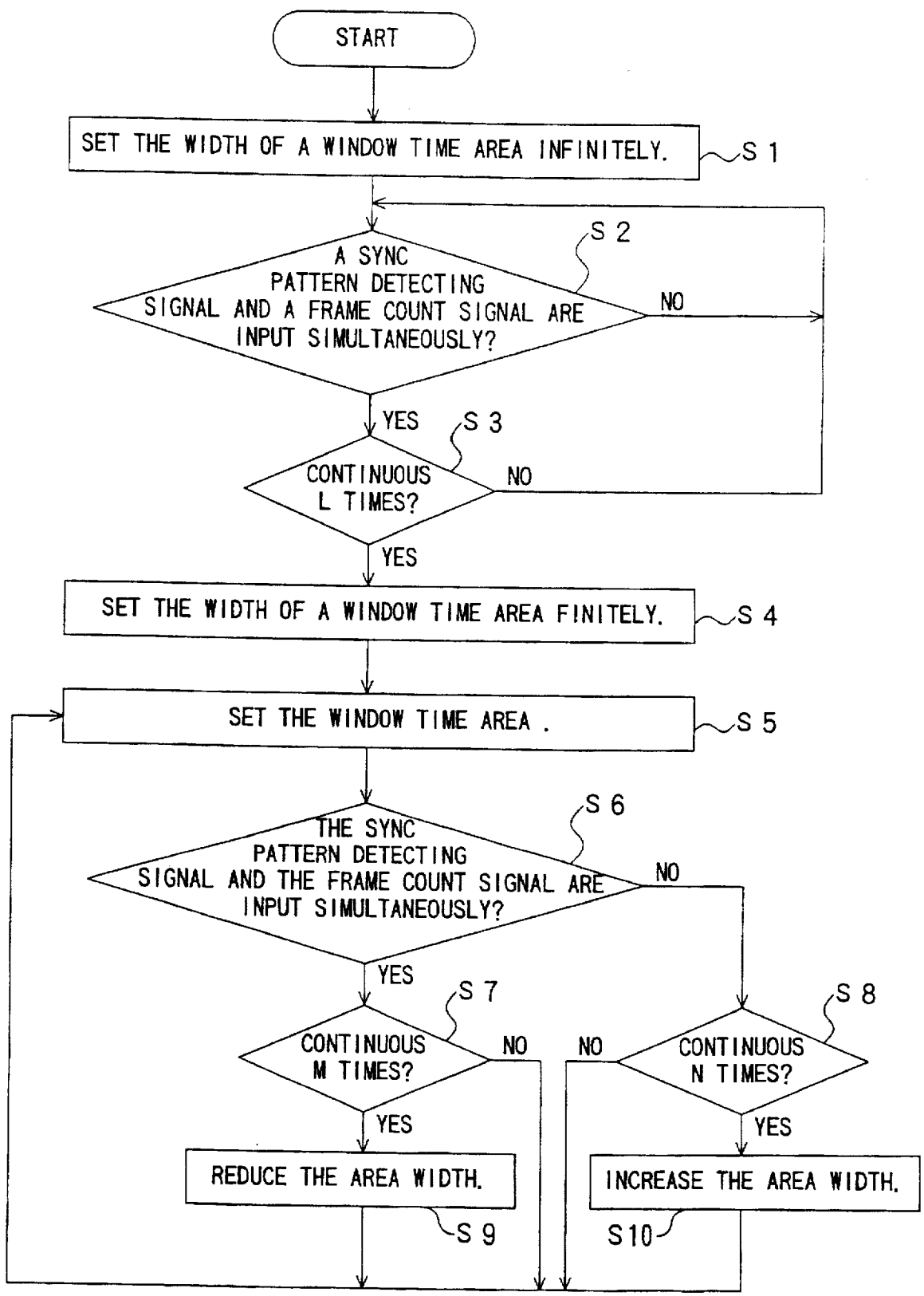
FIG. 2 is a flowchart showing a method for setting a window time area in a sync detecting method according to the present invention.
Figure 3:
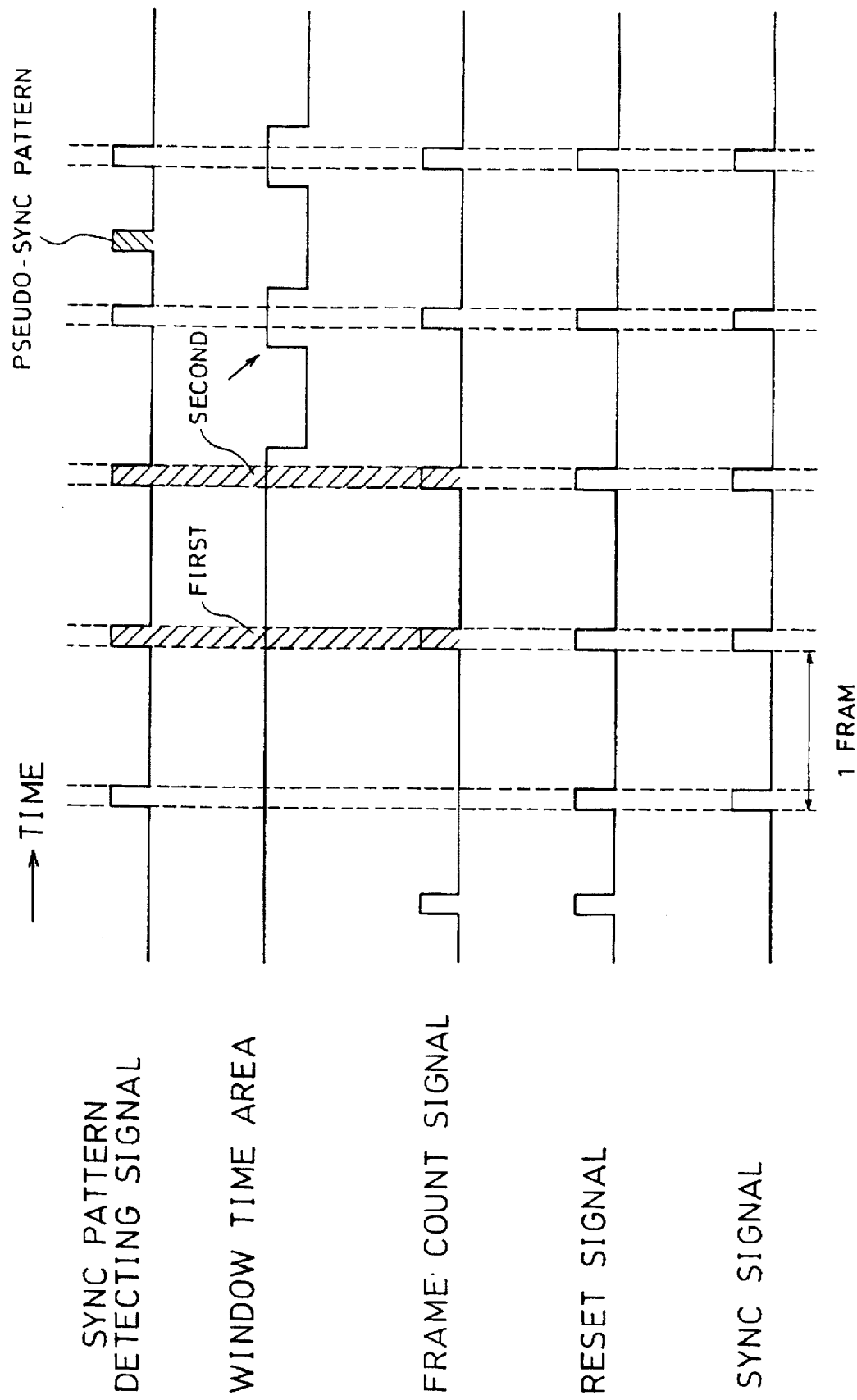
FIG. 3 is a timing chart for explaining operation in a sync detecting method according to Embodiment 1 of the present invention.
Figure 4:
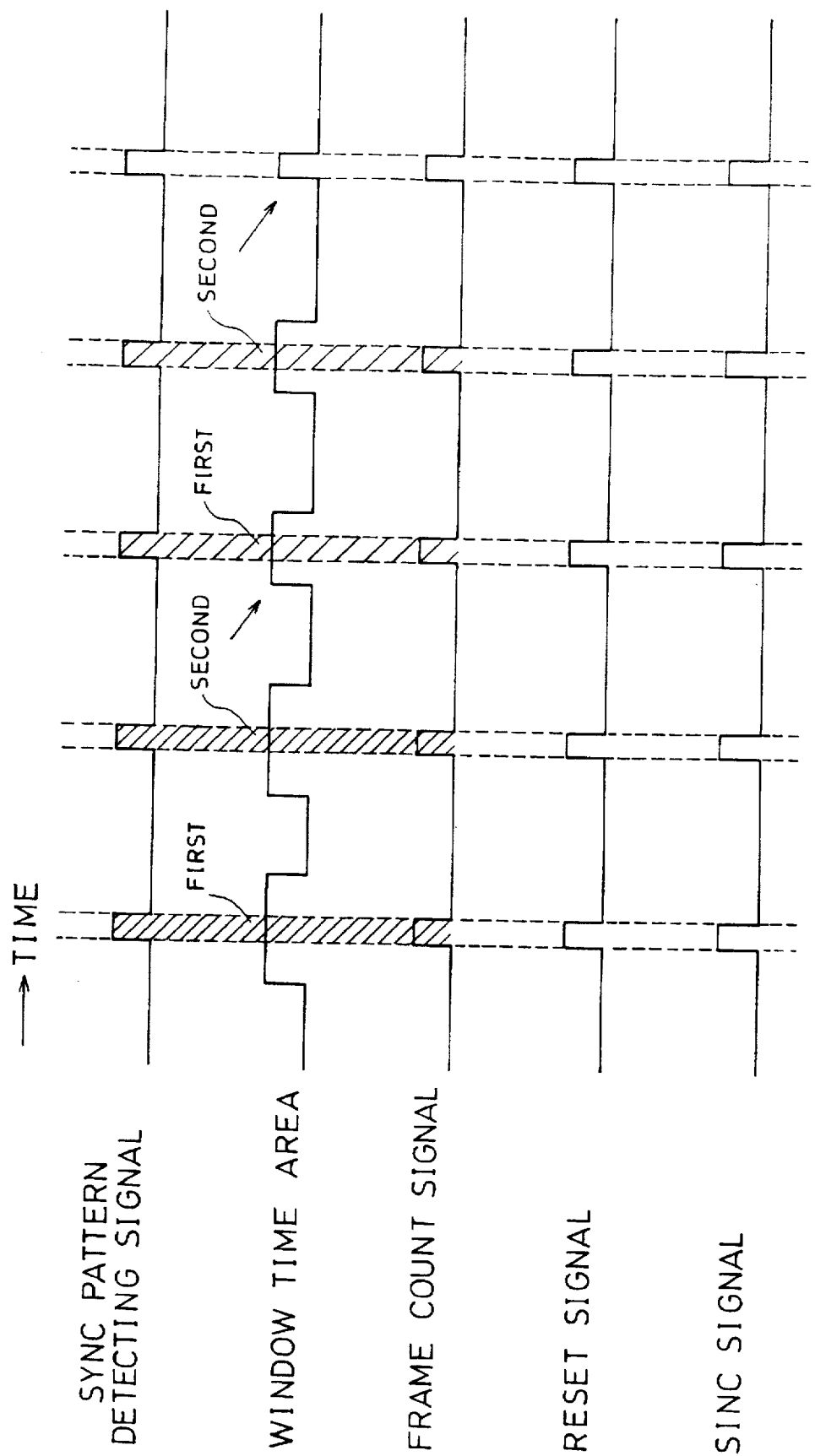
FIG. 4 is a timing chart for explaining operation in the sync detecting method according to Embodiment 1 of the present invention.
Figure 5:
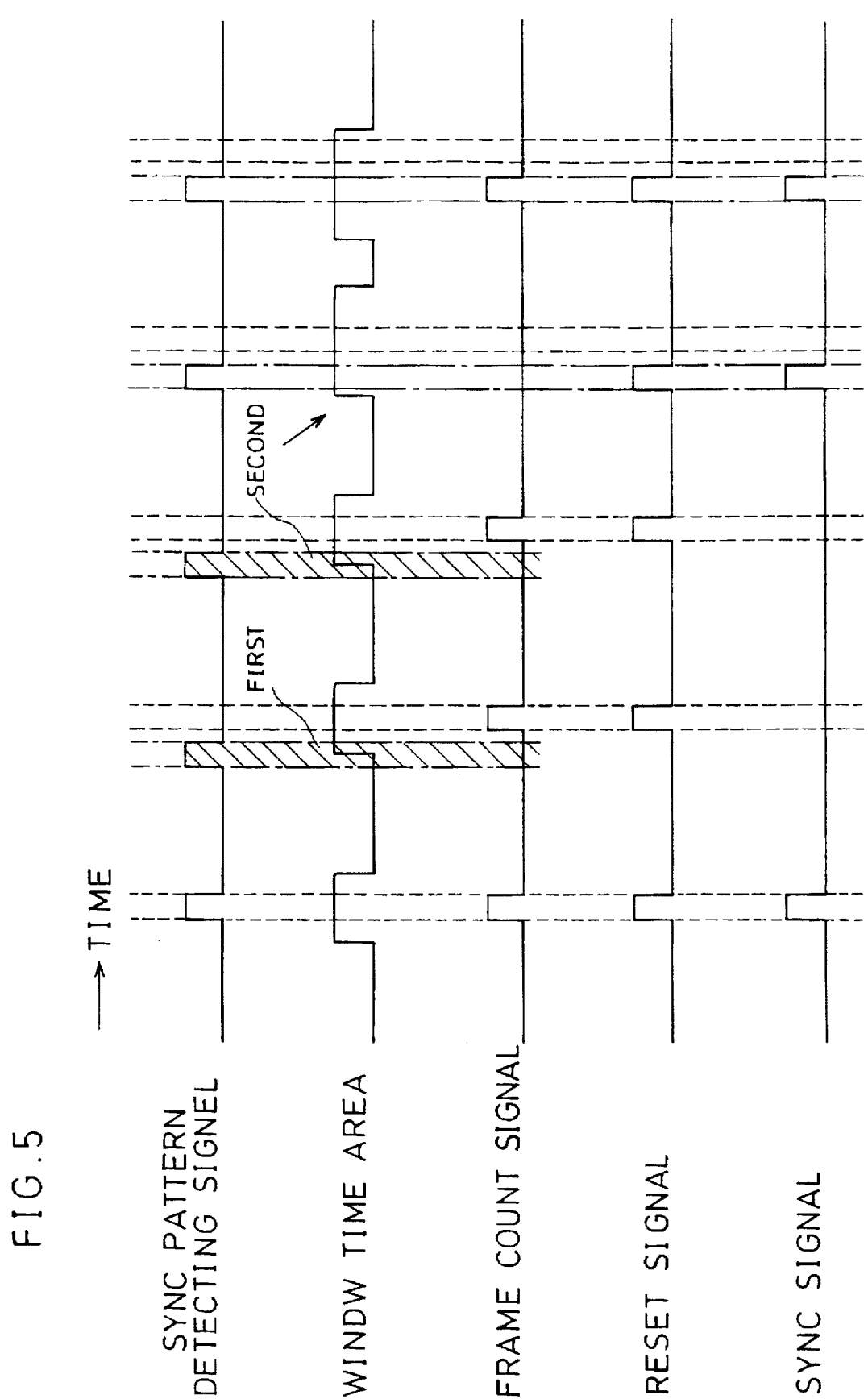
FIG. 5 is a timing chart for explaining operation in the sync detecting method according to Embodiment 1 of the present invention.

FIG. 2 is a flowchart showing a method for setting a window time area according to the present embodiment. FIGS. 3, 4 and 5 are timing charts for explaining operation in the sync detecting method according to the present embodiment. The window time area is shown in the form of a pulse signal. If the pulse signal is on "H" level, the window time area is set.

In Step S1, the width of the window time area is set infinitely. In FIG. 3, a pulse signal indicative of the window time area is kept on "H" level at first. In this case, when a sync pattern detecting signal is input, the sync manage circuit 80 simultaneously outputs a sync signal and a reset signal. When the reset signal is input, the frame counter 20 resets the count of clock signals, and restarts count. Normally, the timing of the sync pattern detecting signal is coincident with that of the frame count signal.

In Steps S2 and S3, it is decided whether the sync pattern detecting signal and the frame count signal are simultaneously input continuously specific times or not. In FIG. 3, the number of specific times is 2. Since the sync pattern detecting signal and the frame count signal are simultaneously input continuously twice, the width of the window time area is set finitely in Step S4 and the window time area is set in the vicinity of the frame count signal in Step S5. The window time area is set in the vicinity of the frame count signal, so that a malfunction such as pseudo-sync pattern detection can be prevented.

In Step S6, it is decided whether the sync pattern detecting signal and the frame count signal are simultaneously input or not. If they are simultaneously input, it is decided whether simultaneous input is continuous specific times or not in Step S7. If the simultaneous input is continuous specific times, the width of the window time area is reduced in Step S9.

FIG. 4 is a timing chart in which the width of the window time area is reduced. In FIG. 4, the number of specific times is 2. Since the sync pattern detecting signal and the frame count signal are simultaneously input continuously twice, the next window time area is reduced. Further, since the sync pattern detecting signal and the frame count signal are simultaneously input continuously twice, the next window time area is reduced.

While the width of the window time area is reduced to that of the sync pattern detecting signal in FIG. 4, some margin can be allowed in an actual circuit according to the reliability of a transmission line or the like. FIG. 3 not followed by FIG. 4.

If it is decided that the sync pattern detecting signal and the frame count signal are not input simultaneously in Step S6, it is decided whether they are not simultaneously input continuously specific times in Step S8. If they are not simultaneously input continuously specific times, the width of the window time area is increased in Step S10.

FIG. 5 is a timing chart for increasing the width of the window time area. The timing of a second sync pattern detecting signal is shifted forward and gets out of the window time area. Consequently, a sync signal is not output. In this case, a reset signal is not output so that the timing of a frame count signal is not changed. Accordingly, the sync pattern detecting signal and the frame count signal are not input simultaneously.

If the sync pattern detecting signal and the frame count signal are not simultaneously input continuously specific times, the width of the next window time area is increased. In FIG. 5, the number of specific times is 2. Since the width of the window time area is increased, the next sync pattern detecting signal enters the window time area so that the sync signal is output. In this case, the reset signal is also output. Consequently, the frame counter 20 is reset so that the timing of the frame count signal is changed. Subsequently, the sync pattern detecting signal and the frame count signal are input simultaneously. The timing of the window time area is also changed together with that of the frame count signal.

Thus, the width of the window time area is made variable and is changed on the basis of the timings of the sync pattern detecting signal and the frame count signal. Consequently, a malfunction such as pseudo-sync pattern detection can be prevented. In addition, even if the timing of a sync pattern is shifted, synchronization can immediately be performed.

The decision in Step S6 can be altered to a decision whether the sync pattern detecting signal is input in the window time area or not. More specifically, if the sync pattern detecting signal is input in the window time area continuously specific times, the width of the next window time area is reduced. If the sync pattern detecting signal is not input in the window time area continuously specific times, the width of the next window time area is increased. Also in these cases, the same effects as in the present embodiment can be obtained.

(Embodiment 2)

An error detecting circuit which is not shown in FIG. 1 decides whether the input data has an error or not, and outputs the result of error decision. In this case, the data is divided on the basis of the sync signal output from the sync manage circuit 30 so as to perform error decision. An external circuit also reads the input data on the basis of the sync signal output from the sync manage circuit 30.

There is a problem in that the sync signal is absent. As shown in the timing chart of FIG. 5, if the sync signal is absent, the error detecting circuit recognizes sync signal absence as a frame so that a malfunction occurs. Also in the case where the external circuit reads the input data, a plurality of frame data are recognized as one frame data. In order to prevent such malfunctions, it is necessary to generate at least one sync signal for each frame.

The present embodiment features that an interpolating sync signal is output in a frame in which the sync signal is not output. The interpolating sync signal is output when the frame count signal is input. A method for outputting a sync signal other than the interpolating sync signal, a method for outputting a reset signal and a method for setting a window time area according to the present embodiment are the same as in Embodiment 1.

Figure 6:
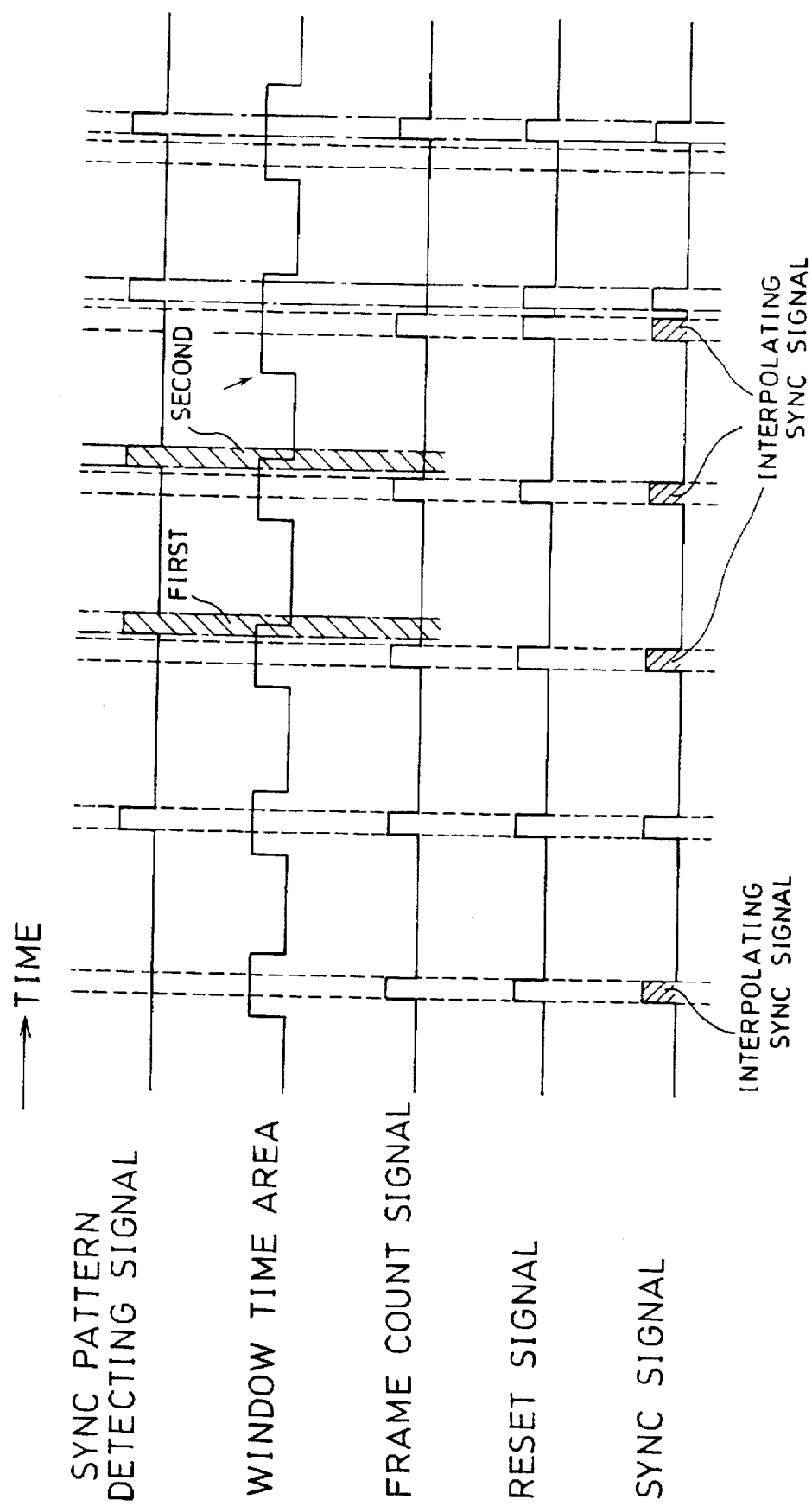
FIG. 6 is a timing chart for explaining operation in a sync detecting method according to Embodiment 2 of the present invention.

FIG. 6 is a timing chart for explaining operation in a sync detecting method according to Embodiment 2 of the present invention.

If a correct sync pattern cannot be detected due to data transmission errors, i.e., a sync pattern detecting signal is not input, an interpolating sync signal is output when a frame count signal is input.

Even if the timing of the sync pattern detecting signal is shifted backward and gets out of the window time area, the interpolating sync signal is output when the frame count signal is input.

Since the sync pattern detecting signal and the frame count signal are not simultaneously input continuously twice, the width of the next window time area is increased. Consequently, the next sync pattern detecting signal is input in the window time area, so that the sync signal is output. When the frame count signal is input, the interpolating sync signal is output.

The error deciding circuit executes error decision on the basis of the sync signals including the interpolating sync signal.

According to Embodiment 1, if the correct sync pattern cannot be detected due to data transmission errors, the sync signal is not output. According to the present embodiment, however, the interpolating sync signal is output at the timing of the frame count signal. Consequently, the sync signal is not absent. For example, the error deciding circuit executes error decision correctly so as to accurately decide whether data can be employed or not.

(Embodiment 3)

Figure 12:
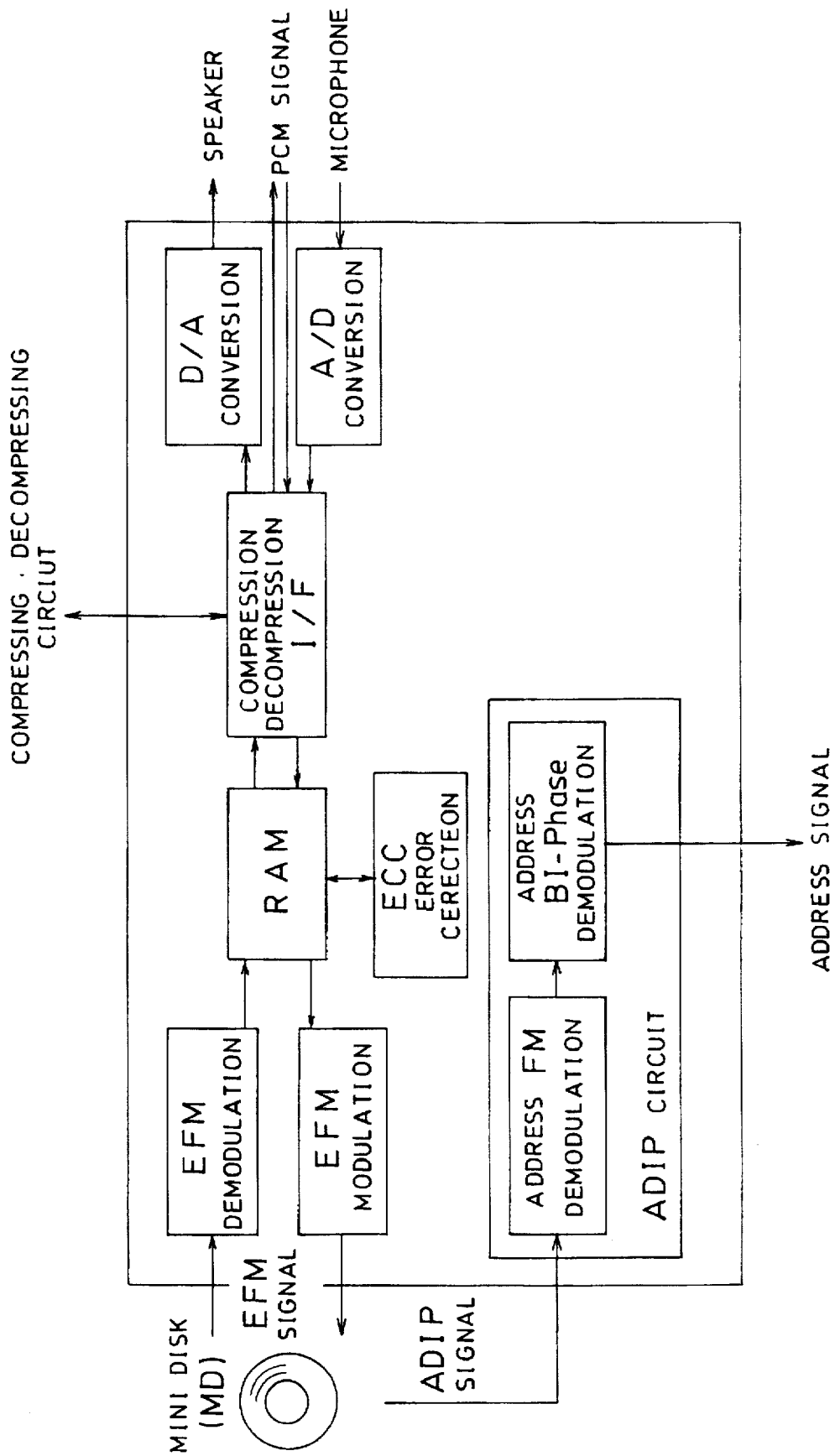
FIG. 12 is a block diagram showing the schematic structure of a mini disk unit.
Figure 13:
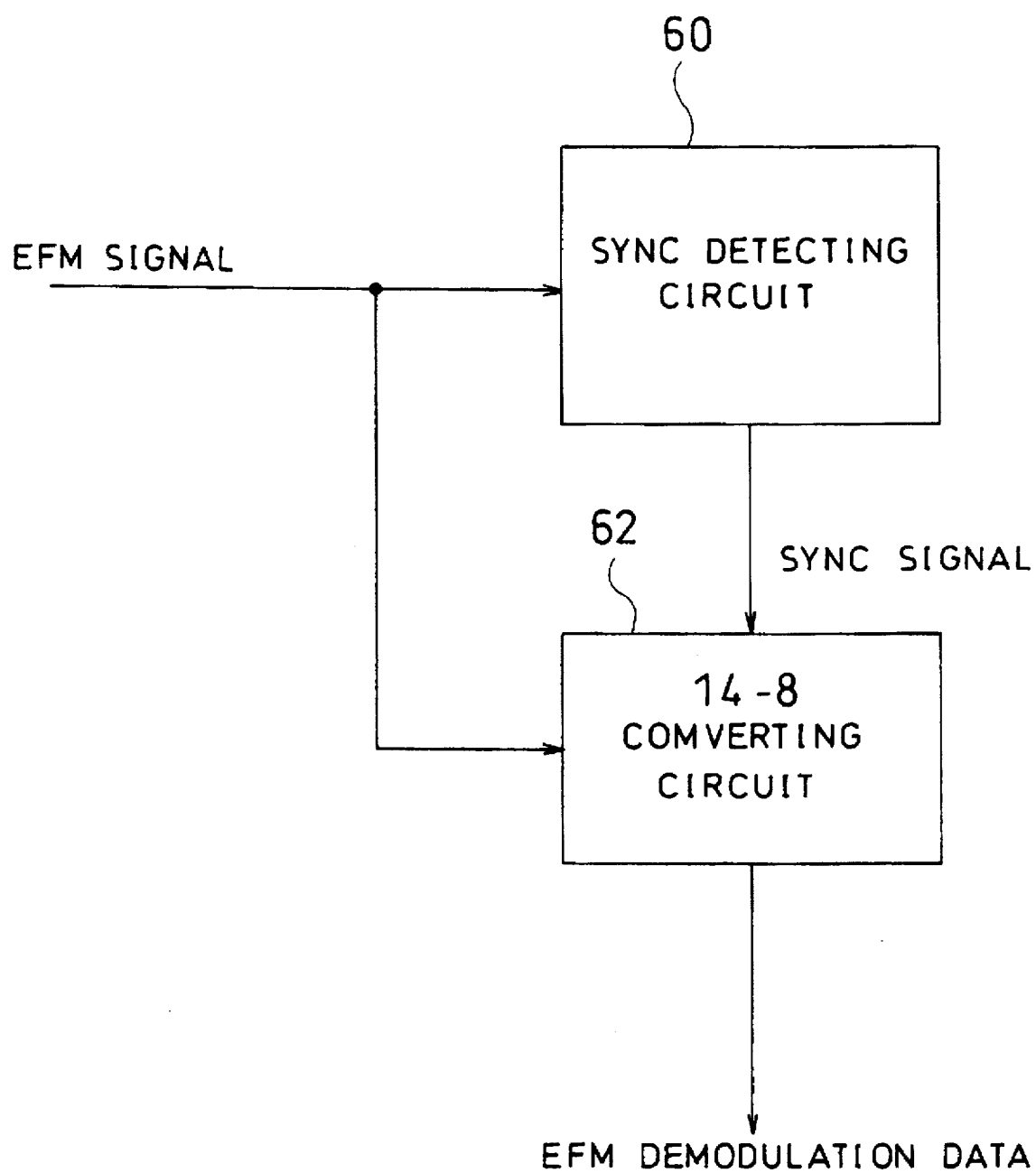
FIG. 13 is a block diagram showing the schematic structure of an EFM demodulating circuit.

In the case of the operation such as music jump reproduction or tracking-off which is not ordinarily executed in the mini disk unit shown in FIG. 12, the sync pattern of an ADIP signal should be detected immediately.

In order to correspond to such operation, a sync detecting method according to Embodiment 3 of the present invention comprises the processing of a window interrupt signal wherein the width of a window time area is set infinitely when the window interrupt signal is input. A method for outputting a sync signal and an interpolating sync signal, a method for outputting a reset signal and a method for setting a window time area except for the case where the window interrupt signal is input are the same as in Embodiment 2.

Figure 7:
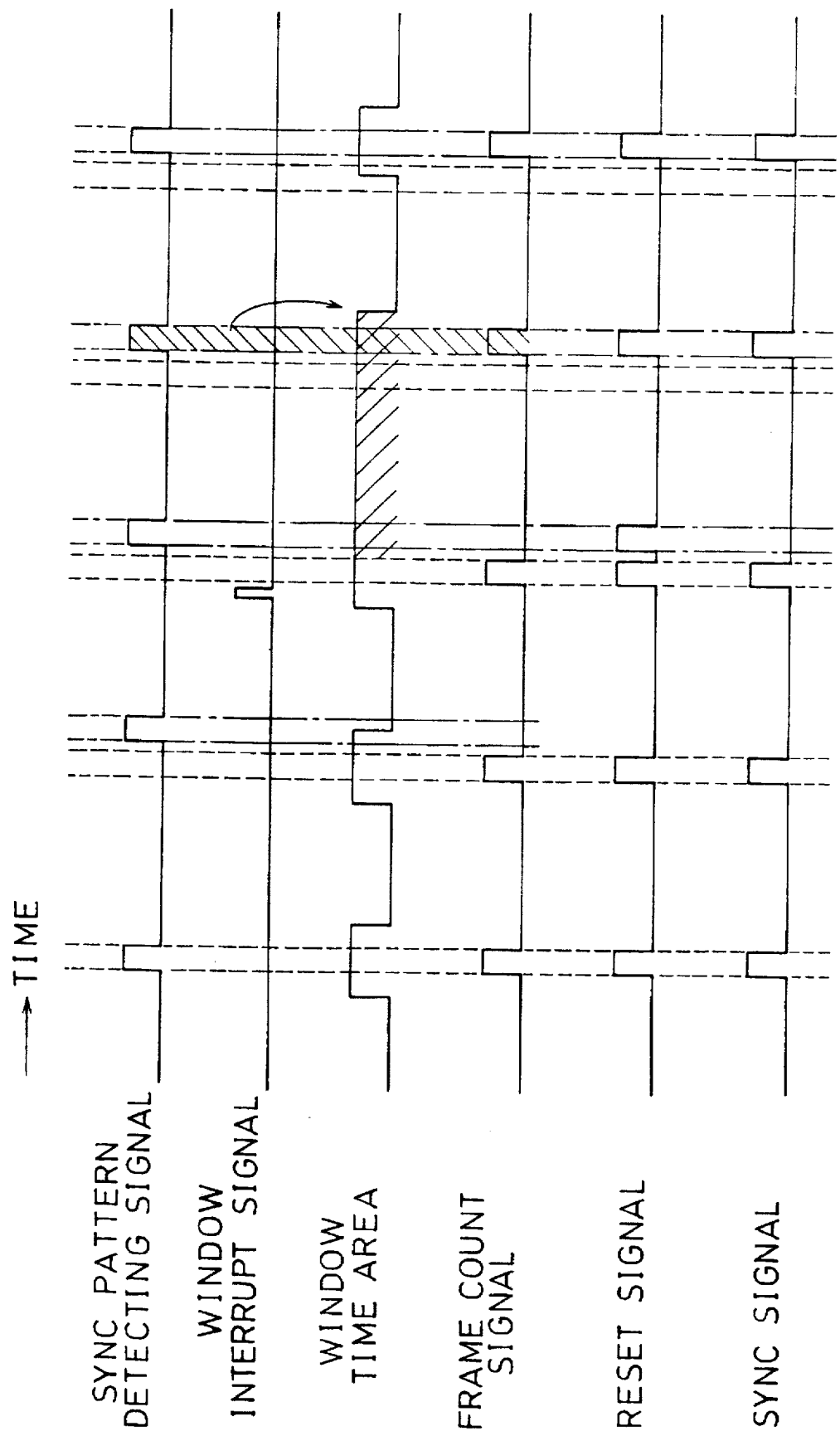
FIG. 7 is a timing chart for explaining operation in a sync detecting method according to Embodiment 3 of the present invention.

FIG. 7 is a timing chart for explaining operation in the sync detecting method according to Embodiment 3 of the present invention.

Since a first sync pattern detecting signal is input simultaneously with a frame count signal, a reset signal and a sync signal are output at the same time. The timing of a second sync pattern detecting signal is shifted backward to get out of the window time area. Therefore, neither the sync signal nor the reset signal is output. When the frame count signal is input, the interpolating sync signal and the reset signal are output.

Assuming that a window interrupt signal is input, the width of the window time area is set infinitely.

When either the sync pattern detecting signal or the frame count signal is input earlier to the window time area, the sync signal is output. Within the period from the output of the sync signal till the closing of the window time area (a portion shown in lines which are slanted right and downward in FIG. 7), the sync signal is not output when either the sync pattern detecting signal or the frame count signal is input. When the sync pattern detecting signal and the frame count signal are simultaneously input, the sync signal is output. When the sync pattern detecting signal or the frame count signal is input, the reset signal is output. When the sync pattern detecting signal and the frame count signal are input simultaneously, the window time area which is infinitely set is closed after the sync signal is output.

Thus, even if the timing of a sync pattern is shifted, the window interrupt signal is input so that a correct sync pattern can be detected immediately.

As described above, the condition of closing the window time area is that the sync pattern detecting signal and the frame count signal are input simultaneously. The sync pattern detecting signal and the frame count signal may simultaneously be input continuously specific times.

Figure 8:
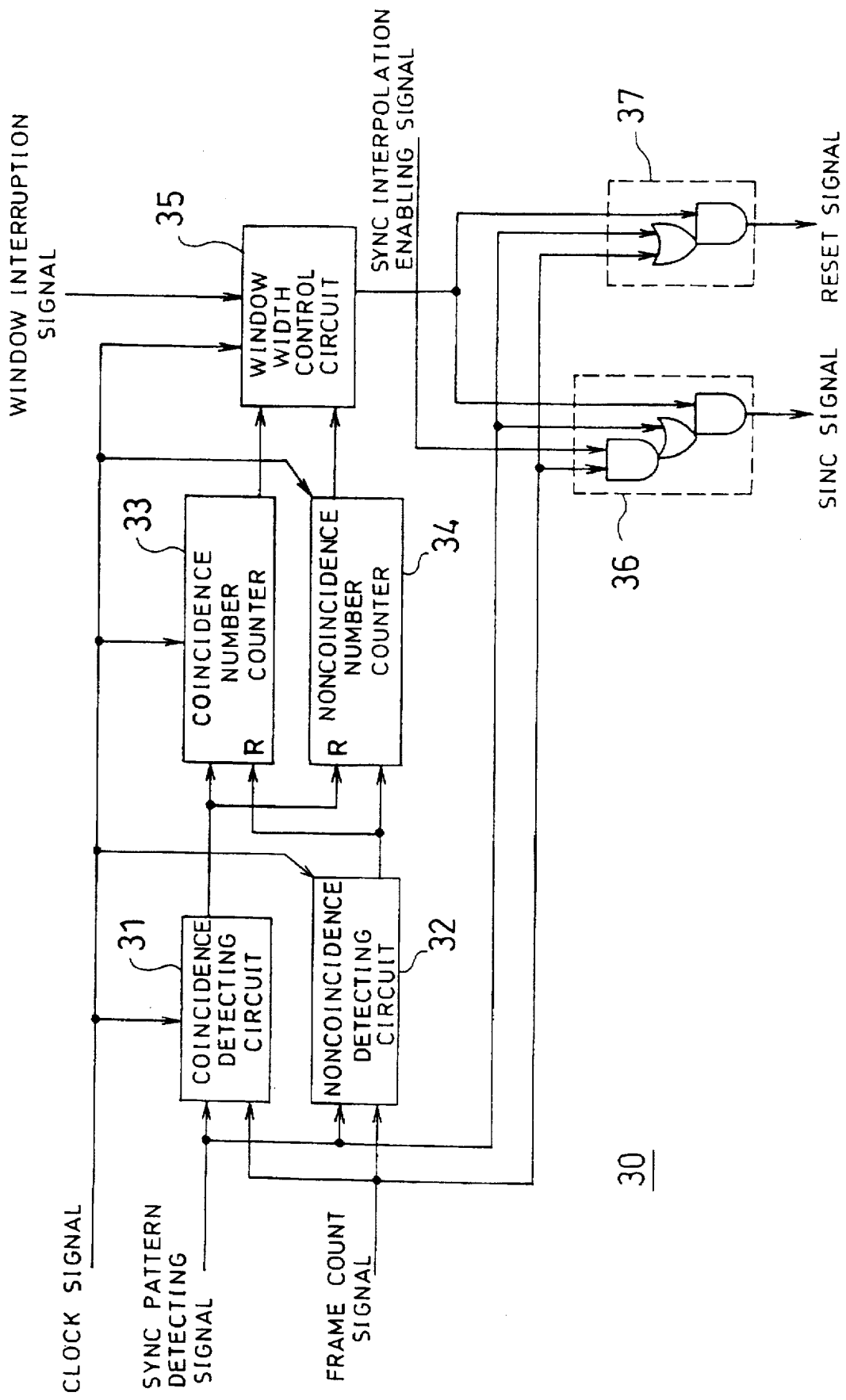
FIG. 8 is a diagram showing the structure of a sync manage circuit in the sync detecting circuit according to Embodiment 3 of the present invention.

FIG. 8 is a block diagram showing the structure of a sync manage circuit in a sync detecting circuit according to Embodiment 3. The sync manage circuit according to Embodiment 3 corresponds to the sync manage circuit 30 shown in FIG. 1. A clock signal, a sync pattern detecting signal, a frame count signal and a window interrupt signal are input from the outside, and a sync signal and a reset signal are output. A sync interpolation enabling signal for controlling the output of an interpolating sync signal is sent from the outside.

If a sync pattern detecting signal is coincident with a frame count signal, a coincidence detecting circuit 31 outputs a signal. If the sync pattern detecting signal is not coincident with the frame count signal, a noncoincidence detecting circuit 32 outputs a signal. A coincidence number counter 33 counts signals output from the coincidence detecting circuit 31. When a signal output from the noncoincidence detecting circuit 32 is input through a reset terminal R, the coincidence number counter 33 resets a count value. More specifically, the count value of the coincidence number counter 33 indicates the number of times in which the sync pattern detecting signal is continuously coincident with the frame count signal. A noncoincidence number counter 34 counts signals output from the noncoincidence detecting circuit 32. When a signal output from the coincidence detecting circuit 31 is input through the reset terminal R, the noncoincidence number counter 34 resets a count value. More specifically, the count value of the noncoincidence number counter 34 indicates the number of times in which the sync pattern detecting signal is not continuously coincident with the frame count signal.

A window width control circuit 35 sets the width of a window time area on the basis of the count values of the coincidence number counter 33 and the noncoincidence number counter 34. Within the width thus set, an output signal is set to the "H" level. A logical circuit 38 outputs a sync signal when the signal output from the window width control circuit 35 is on the "H" level and the sync pattern detecting signal is input. When the sync interpolation enabling signal is on the "H" level, the interpolating sync signal is output if only the frame count signal is input. A logical circuit 37 outputs a reset signal when the signal output from the window width control circuit 85 is on the "H" level and the sync pattern detecting signal or the frame count signal is input.

When the window interrupt signal is input, the window width control circuit 85 sets the width of the window time area infinitely and keeps an output signal on the "H" level.

By using the sync manage circuit shown in FIG. 8, it is possible to implement the sync detecting circuit according to Embodiment 3.

(Embodiment 4)

The method for outputting an interpolating sync signal when inputting only a frame count signal which is described in Embodiment 2 is extremely effective in order to enhance the reliability of the operation of a circuit which utilizes a sync signal. As seen from the timing chart of FIG. 6, however, the interpolating sync signal and the sync signal obtained by the input of the sync pattern detecting signal are output during one frame if the sync pattern detecting signal is input in the window time area later than the frame count signal. For this reason, there is a probability that the reliability of the operation of the circuit which utilizes the sync signal will be lowered.

A sync detecting method according to Embodiment 4 prevents the output of two sync signals or more every frame.

Figure 9:
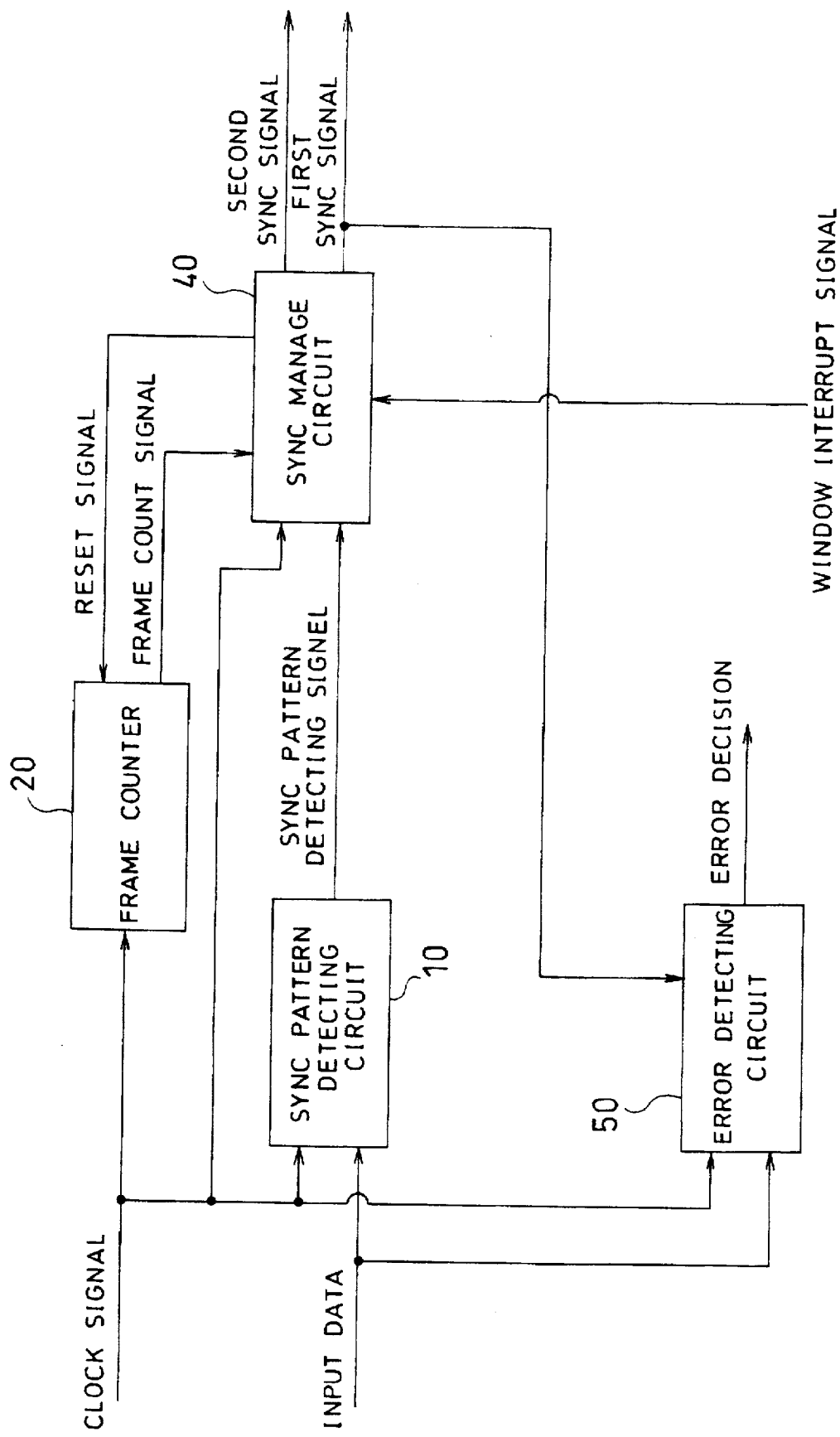
FIG. 9 is a diagram showing the structure of a sync detecting circuit according to Embodiment 4 of the present invention.

FIG. 9 shows the structure of a sync detecting circuit according to Embodiment 4 of the present invention. In FIG. 9, a sync pattern detecting circuit is indicated at 10, a frame counter is indicated at 20, a sync manage circuit is indicated at 40, and an error detecting circuit is indicated at 50.

The sync pattern detecting circuit 10 matches a sync pattern for the input digital data. When the same bit pattern as the sync pattern is detected, a sync pattern detecting signal is output.

The frame counter 20 counts the input clock signals for the bit number of a frame of the input data, and then outputs a frame count signal. When a reset signal is input from the sync manage circuit 40, the count of the clock signals is reset.

The sync manage circuit 40 sets therein first and second variable window time areas having the same cycle as that of a sync signal according to the sync pattern detecting signal and the frame count signal which are input. When the sync pattern detecting signal is input in the first window time area, a first sync signal is output. When the sync pattern detecting signal is input to the outside of the first window time area, the first sync signal is not output. When the sync pattern detecting signal is input in the second window time area, a second sync signal is output. When the sync pattern detecting signal is input to the outside of the second window time area, the second sync signal is not output. When the sync pattern detecting signal and the frame count signal are input in the first window time area, a reset signal is output to the frame counter 20.

The error detecting circuit 50 decides the errors of the input digital data on the basis of the second sync signal output from the sync manage circuit 40.

Figure 10:
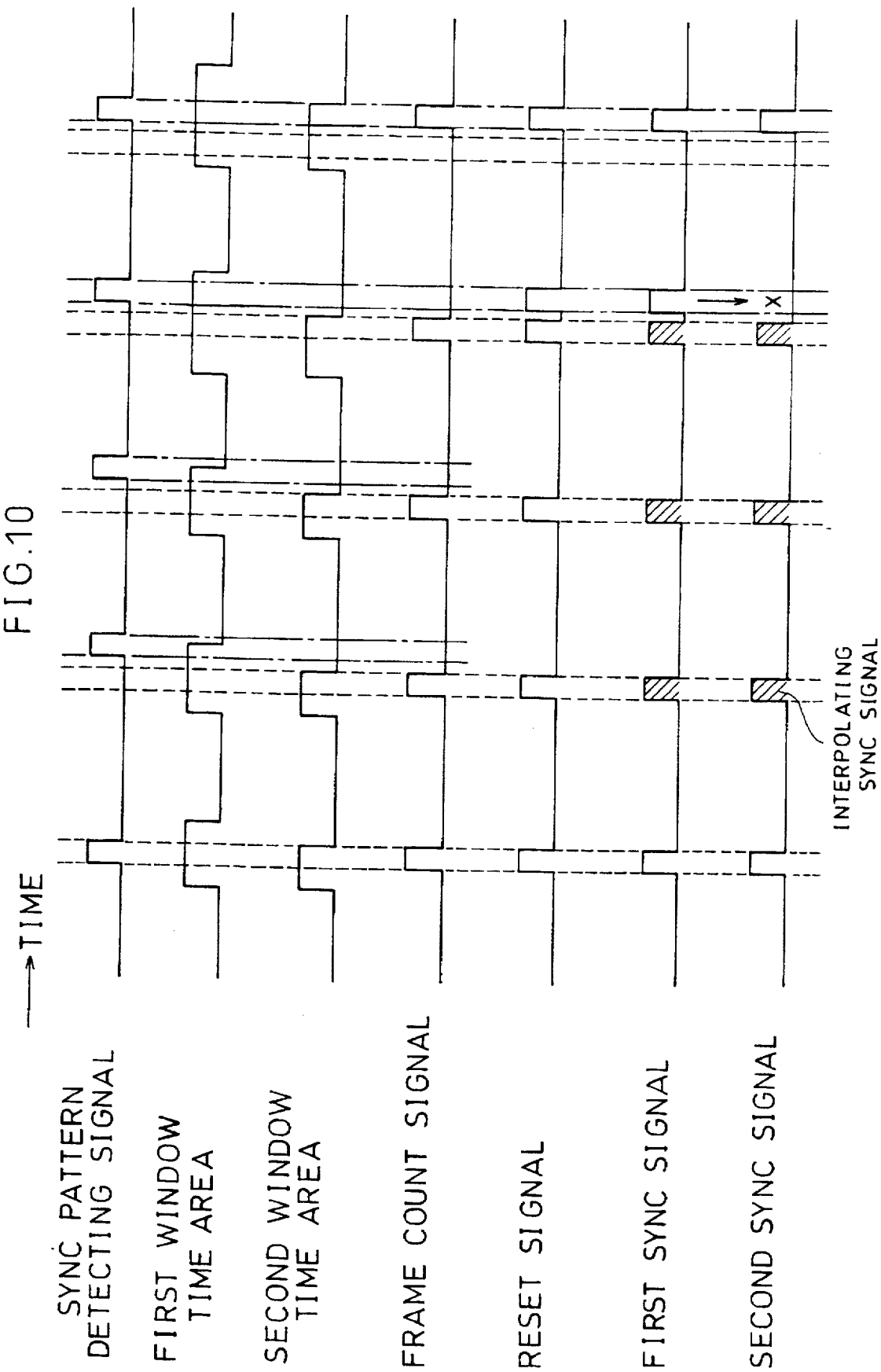
FIG. 10 is a timing chart for explaining operation in a sync detecting method according to Embodiment 4 of the present invention.

FIG. 10 is a timing chart for explaining operation in the sync detecting method according to Embodiment 4 of the present invention.

A method for setting the first window time area and a method for outputting the first sync signal and the reset signal are the same as those in Embodiment 3. A method for setting the second window time area and a method for outputting the second sync signal are also the same as those in Embodiment 3 and different from those in Embodiment 3 in that the second window time area is closed when the second sync signal is output.

Since a first sync pattern detecting signal is input at a correct timing, a reset signal, a first sync signal and a second sync signal are output.

It is assumed that the timing of a second sync pattern detecting signal starts to be shifted backward. Consequently, the second sync pattern detecting signal gets out of the first and second window time areas, so that the first and second sync signals are not output. When a frame count signal is input, an interpolating sync signal is output as the first and second sync signals.

The sync pattern detecting signal and the frame count signal are not simultaneously input continuously twice. For this reason, the widths of the first and second window time areas are increased. Consequently, the next sync pattern detecting signal enters the first window time area so that the first sync signal is output. When the frame count signal is input, the interpolating sync signal is output. Therefore, two first sync signals are output in this frame.

However, the second window time area is closed when the second sync signal is output once. Consequently, the second sync signal is not output twice. Accordingly, only the interpolating sync signal is output in this frame.

When the sync pattern detecting signal is input, the reset signal is output. For this reason, the timing of the next sync pattern signal is coincident with that of the frame count signal.

According to the sync detecting method of Embodiment 4, the second sync signal is output only once every frame. Accordingly, the second sync signal can be used to enhance the reliability of the operation of the circuit which utilizes the sync signal.

Figure 11:
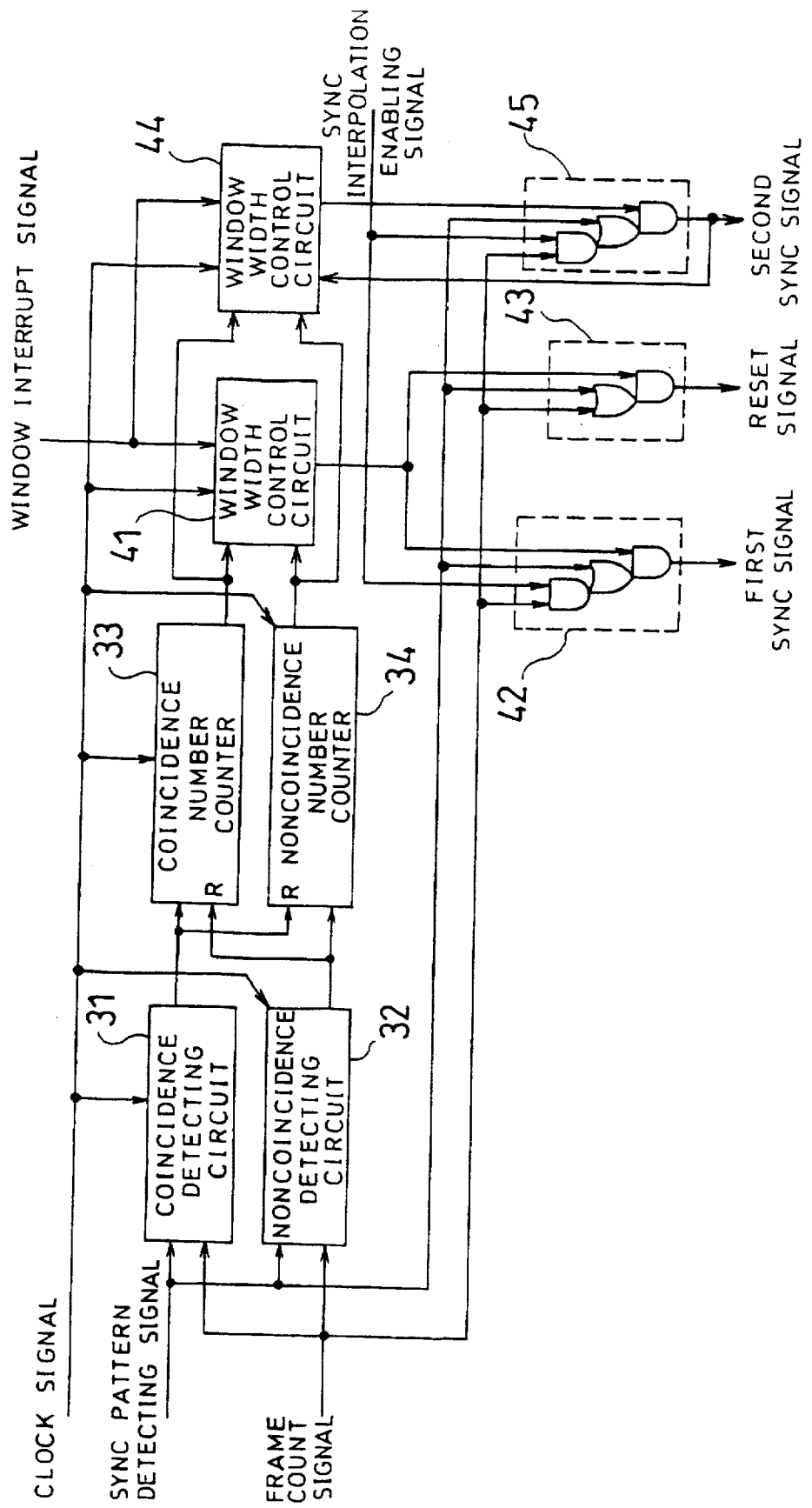
FIG. 11 is a diagram showing the structure of a sync manage circuit in the sync detecting circuit according to Embodiment 4 of the present invention.

FIG. 11 is a block diagram showing the structure of the sync manage circuit of the sync detecting circuit according to Embodiment 4. The sync manage circuit according to Embodiment 4 corresponds to the sync manage circuit 40 shown in FIG. 9. A clock signal, a sync pattern detecting signal, a frame count signal and a window interrupt signal are input from the outside, and a sync signal and a reset signal are output. A sync interpolation enabling signal for controlling the output of the interpolating sync signal is sent from the outside. The same components as those of the sync manage circuit shown in FIG. 8 have the same designations, which will not be described.

A first window width control circuit 41 sets the width of a window time area on the basis of the count values of a coincidence number counter 33 and a noncoincidence number counter 34. Within the width thus set, an output signal is set to the "H" level. A logical circuit 42 outputs a first sync signal when a signal output from the first window width control circuit 41 is on the "H" level and the sync pattern detecting signal is input. If the sync interpolation enabling signal is on the "H" level, the interpolating sync signal is output when only the frame count signal is input. A logical circuit 43 outputs a reset signal when the signal output from the first window width control circuit 41 is on the "H" level and the sync pattern detecting signal or the frame count signal is input.

A second window width control circuit 44 sets the width of a window time area on the basis of the count values of the coincidence number counter 33 and the noncoincidence number counter 34. Within the width thus set, an output signal is set to the "H" level. A logical circuit 45 outputs a second sync signal when a signal output from the second window width control circuit 44 is on the "H" level and the sync pattern detecting signal is input. The second sync signal is fed back to the second window width control circuit 44. The second window width control circuit 44 sets an output signal to the "L" level when the second sync signal is input. When the sync interpolation enabling signal is on the "H" level and only the frame count signal is input, the interpolating sync signal is output.

The first and second window width control circuits 41 and 44 input a window interrupt signal to set the widths of the window time areas infinitely and set output signals to the "H" level.

By using the sync manage circuit shown in FIG. 11, it is possible to implement the sync detecting circuit according to Embodiment 4.

Although the present invention has fully been described by way of example with reference to the accompanying drawings, it is to be understood that various changes and modifications will be apparent to those skilled in the art. Therefore, unless otherwise such changes and modifications depart from the scope of the invention, they should be construed as being included therein.

What is claimed is:

1. A sync detecting circuit for inputting a digital signal in which a sync pattern signal is inserted every constant bits by frame-synchronization and modulation, and for detecting the sync pattern signal from the digital signal to output a sync signal, comprising;

a sync pattern detecting circuit for inputting the digital signal and detecting the same signal pattern as that of the sync pattern signal from the digital signal to output a sync pattern detecting signal, a frame counter for counting the clock signals which are synchronized with the digital signal, and outputting a frame count signal when a count number reaches the number of bits for one frame having the constant number of bits and the sync pattern signal, a sync manage circuit for setting therein first and second variable window time areas having the same time cycle as that of the insertion of the sync pattern signal on the basis of a timing at which the sync pattern detecting signal is input and a timing at which the frame count signal is input, outputting a first sync signal when the sync pattern detecting signal is input in the first window time area, and outputting a second sync signal and closing the second window time area when the sync pattern detecting signal is input in the second window time area, wherein the sync manage circuit outputs a reset signal to the frame counter when the sync pattern detecting signal or the frame count signal is input in the first window time area, and wherein the frame counter resets the count number of the clock signals when the reset signal is input.

2. The sync detecting circuit according to claim 1, wherein the sync manager circuit comprises a first window width control circuit for setting the width of the first window time area based on a time at which the sync pattern detecting signal is input and a time at which the frame count signal is input, and for outputting a first signal of a first logic level when inside of the first window time area and of a different second logic level when outside of the first window time area, a first logical circuit for inputting the first signal output from the first window width control circuit and for outputting the first sync signal when the sync pattern detecting signal is input while the first signal output from the first window width control circuit is at the first logic level, a second window width control circuit for setting the width of the second window time area based on a time at which the sync pattern detecting signal is input and a time at which the frame count signal is input, and for outputting a second signal of a third logic level when inside of the second window time area and of a different fourth logic level when outside of the second window time area, a second logical circuit for inputting the second signal output from the second window width control circuit and for outputting the second sync signal when the sync pattern detecting signal is input while the second signal output from the second window width control circuit is at the third logic level, and wherein the second window width control circuit alters the logic level of the second signal output from the second window width control circuit to the fourth logic level when the second sync signal is input into the second window width control circuit from the second logical circuit.

3. A sync detecting method for detecting a sync pattern signal from a digital signal in which the sync pattern signal is inserted every constant number of bits by frame-synchronization and modulation, and for outputting a sync signal, comprising:

a sync pattern detecting step of detecting a same signal pattern of that of the sync pattern signal from the digital signal to output a sync pattern detecting signal;

a first sync manage step of setting a variable window time area having a same time cycle as that of the insertion of the sync pattern signal, and outputting the sync signal which indicates that a correct sync pattern signal is detected when the sync pattern detecting signal is output in the window time area;

a frame count step of counting clock signals which are synchronized with the digital signal, and outputting a frame count signal when a count number reaches a bit number of a frame having the constant number of bits and the sync pattern signal, and said first sync manage step includes a first processing for setting the width of the window time area based on a time at which the sync pattern detecting signal is output and a time at which the frame count signal is output, a second processing for outputting the sync signal when the sync pattern detecting signal is output in the window time area, a third processing for outputting a reset signal when the sync pattern detecting signal or the frame count signal is output in the window time area, and a fourth processing for outputting the sync signal when the frame count signal is output in the window time area, and said frame count step includes a processing for resetting the count number of the clock signals when the reset signal is output; and a second sync manage step including the first processing, second processing and fourth processing as in the first sync manage step, and a processing for closing the window time area when the sync signal is output.

4. The sync detecting method according to claim 3, further comprising an error deciding step of deciding the presence of an error in the digital signal based on the sync signal output during said second sync manage step.

5. A sync detecting method for detecting a sync pattern signal from a digital signal in which the sync pattern signal is inserted every constant number of bits by frame-synchronization and modulation, and for outputting a sync signal, comprising:

a sync pattern detecting step of detecting a same signal pattern of that of the sync pattern signal from the digital signal to output a sync pattern detecting signal;

a sync manage step of setting a variable window time area having a same time cycle as that of the insertion of the sync pattern signal, and outputting the sync signal which indicates that a correct sync pattern signal is detected when the sync pattern detecting signal is output in the window time area;

a frame count step of counting clock signals synchronized with the digital signal, and outputting a frame count signal when a count number reaches a bit number of a frame having the constant number of bits and the sync pattern signal, and said sync manage step includes a first processing for setting the width of the window time area based on a time at which the sync pattern detecting signal is output and a time at which the frame count signal is output, a second processing for outputting the sync signal when the sync pattern detecting signal is output in the window time area, a third processing for outputting a reset signal when the sync pattern detecting signal or the frame count signal is output in the window time area, and a fourth processing for outputting the sync signal when the frame count Signal is output in the window time area, and said frame count step includes a processing for resetting the count number of the clock signals when the reset signal is output; and an error deciding step of deciding the presence of an error in the digital signal based on the sync signal.

6. A sync detecting circuit for inputting a digital signal in which a sync pattern signal is inserted every constant number bits by frame-synchronization and modulation, and for detecting the sync pattern signal from a digital signal to output a sync signal, comprising:

a sync pattern detecting circuit for inputting the digital signal and detecting a same signal pattern as that of the sync pattern signal from the digital signal to output a sync pattern detecting signal;

a sync manage circuit for setting a variable window time area having a same time cycle as that of insertion of the sync pattern signal, and outputting a sync signal indicating that a correct sync pattern signal is detected if the sync pattern detecting signal is input in the window time area;

a frame counter for counting clock signals synchronized with the digital signal, and for outputting a frame count signal when a count number reaches a number of bits for a frame having the constant number of bits and the sync pattern signal, and said sync manage circuit sets the width of the window time area based on a time at which the sync pattern detecting signal is input and a time at which the frame count signal is input, outputs the sync signal when the sync pattern detecting signal is input in the window time area, and outputs a reset signal to the frame counter when the sync pattern detecting signal or the frame count signal is input in the window time area, and said frame counter resets the count number when the reset signal is input; and said sync manage circuit comprises a window width control circuit for setting the width of the window time area based on a time at which the sync pattern detecting signal is input and a time at which the frame count signal is input and for outputting a signal of a first logic level when inside of the window time area and a different second logic level when outside of the window time area, and a logical circuit for inputting the signal output from the window width control circuit and for outputting a sync signal when the sync pattern detecting signal is input while the signal output from the window width control circuit is at the first logic level, said window width control circuit alters the logic level of the output signal to the second logic level when the sync signal is input from the logical circuit.

* * * * *

UNITED STATES PATENT AND TRADEMARK OFFICE
CERTIFICATE OF CORRECTION

PATENT NO. : 5,677,935
DATED : October 14,1997
INVENTOR(S) : Karino

It is certified that error appears in the above-identified patent and that said Letters Patent is hereby corrected as shown below:

On the title page;

In the Assignee section, change "Matsuhita" to --Matsushita--.

Signed and Sealed this

Second Day of May, 2000

Attest:

Q. TODD DICKINSON

*Attesting Officer*       *Director of Patents and Trademarks*